United States Patent [19]
Greenberg et al.

[11] Patent Number: 5,295,138
[45] Date of Patent: Mar. 15, 1994

[54] APPARATUS AND METHOD FOR OPTIMAL FREQUENCY PLANNING IN FREQUENCY DIVISION MULTIPLEXING TRANSMISSIONS

[75] Inventors: A. Frederick Greenberg, New York, N.Y.; G. Stephen Hatcher, Renton; Goson Gu, Seattle, both of Wash.

[73] Assignee: Northwest Starscon Limited Partnership, Krit, Wash.

[21] Appl. No.: 871,893

[22] Filed: Apr. 21, 1992

[51] Int. Cl.$^5$ .................. H04J 1/12; H04J 1/16; H04Q 11/02
[52] U.S. Cl. ..................... 370/57; 370/69.1; 370/76; 370/118; 375/60; 455/62; 455/63; 455/67.3; 455/115; 455/125
[58] Field of Search ............ 370/18, 19, 20, 57, 370/69.1, 120, 121, 123, 70, 71, 75, 76, 118, 122; 375/1, 58, 60; 455/12.1, 17, 62, 63, 67.1, 67.3, 115, 119, 120, 125

[56] References Cited

U.S. PATENT DOCUMENTS

| | | | |
|---|---|---|---|
| 3,586,781 | 6/1971 | Jones | 370/69.1 |
| 3,648,178 | 3/1972 | Hershberg | 370/122 |
| 4,813,036 | 3/1989 | Whitehead | 370/69.1 |
| 4,905,221 | 2/1990 | Ichiyoshi | 370/69.1 |
| 5,105,445 | 4/1992 | Karam et al. | 375/60 |

OTHER PUBLICATIONS

Okinaka, Hideo; Yasuda, Yutaka; and Hirata, Yasuo. "Intermodulation Interference–Minimum Frequency Assignment For Satellite SCPC Syustems", *IEEE Transactions on Communications*, vol. Com-32, No. 4 (Apr. 1984), pp. 462–468.

Fang, Russell J. F. and Sandrin, William A. "Carrier Frequency Assignment For Nonlinear Repeaters", *Comsat Technical Review*, vol. 7, No. 1 (Spring 1977), pp. 227–245.

Babcock, Wallace C. "Intermodulation Interference In Radio Systems: Frequency Of Occurrence And Control By Channel Selection", *The Bell System Tecnhical Journal* (Jan. 1953), pp. 63–73.

Westcott, R. J. and Eng, C. "Investigation Of Multiple f.m./f.d.m. Carriers Through A Satellite t.w.t. Operating Near To Saturation", *Proc. IEE*, vol. 114, No. 6 (Jun. 1967) pp. 726–740.

*Primary Examiner*—Douglas W. Olms
*Assistant Examiner*—Alpus H. Hsu
*Attorney, Agent, or Firm*—Morgan & Finnegan

[57] ABSTRACT

A method and apparatus for operating a frequency division multiplexing (FDM) transmitter within a common communication channel is disclosed. The carrier frequency for each separate channel is adjusted for minimizing intermodulation interference. The system randomly allocates each separate channel within the available bandwidth to provide an initial set of separate channel allocation and corresponding carrier frequencies. Thereafter carrier to intermodulation ratio (C/IM) on each channel is measured and the worst channel with the lowest carrier to intermodulation ratio (C/IM) is removed. The system then repeatedly inserts a channel in available unoccupied bandwidth to produce the largest minimum carrier to intermodulation ratio (C/IM). The deletion and insertion continues until no improvement in minimum carrier to intermodulation ratio (C/IM) can be achieved for said random allocation of separate channels. The selected set of separate channel allocations is further fine-tuned by deleting the worst channel with minimum carrier to intermodulation ratio (C/IM) and deleting one other channel from said separate channel allocations to provide a particular dual channel deletion. The system then repeatedly inserts two channels in available unoccupied bandwidth which produces the largest minimum carrier to intermodulation ratio (C/IM). The system continues on dual deletion and insertion until no improvement in minimum carrier to intermodulation ratio (C/IM) can be achieved for said random allocation of separate channels. The carrier frequencies are then tuned according to said set of separate channel allocation.

8 Claims, 5 Drawing Sheets

APPARATUS AND METHOD FOR OPTIMAL FREQUENCY PLANNING IN FREQUENCY DIVISION MULTIPLEXING TRANSMISSIONS

FIELD OF THE INVENTION

This invention relates generally to Frequency Division Multiplexing (FDM) transmission and in particular to an apparatus and method for providing an optimal frequency plan for transmitting a plurality of channels within a specified bandwidth.

BACKGROUND OF THE INVENTION

A common technique for combining many independent signals so that they can be transmitted over a common communication channel is frequency division multiplexing (FDM).

The common communication channel contains a bandwidth which exceeds the required bandwidth of signals to be transmitted. Therefore individual signals to be transmitted can be multiplexed up in frequency such that the spectrum of the signals may fall within the common communication channel bandwidth. The channel carrier for each signal to be transmitted is chosen such that the resultant modulated signals occupy adjacent, nonoverlapping frequency bands or channels. The composition signal made up of the sum of individual modulated signals, is then transmitted within the common communication channel bandwidth.

Frequency division multiplexing (FDM) is typically used in satellite broadcasting. A common and serious problem in frequency division multiplexing (FDM) is intermodulation interference. Intermodulation interference is due to the amplitude nonlinearity of high-power amplifiers, such as travelling-wave tube amplifiers or klystron amplifiers. In order to derive the maximum power from the amplifiers in a satellite the amplifiers are operated near their saturation regions. The effect of intermodulation interference is to produce signals at a frequency which is the sum or difference of multiples of two or more original or desired frequencies. For example, the mixing of signals at frequencies $f_1$ and $f_2$ might produce energy at the frequency $f_1+f_2$. This derived signal would interfere with a signal intended to be transmitted at the frequency $f_1+f_2$.

Among all intermodulations, the third order is the most severe. Hence there is a need to provide an apparatus and method to plan the frequency of the various signal carriers to be transmitted over a predetermined bandwidth while minimizing third order intermodulation.

Prior systems for adjusting a frequency plan concentrated in intermodulation-free carrier frequency plans or assignment. Since an intermodulation-free carrier frequency plan is rarely achievable, it is more practical to search for a carrier frequency plan which minimizes the worst intermodulation interference level across the channels.

A method for deriving sub-optimal carrier frequency plan for large number of channels has been suggested by Okinaka, et al., *Intermodulation Interference-Minimum Frequency Assignment for Satellite SCPC System*, IEEE Trans. Commun. Vol. 32 No. 4, pp. 462–468 (April 1984). According to the article the system, after an initial frequency plan is set, successively deletes a channel such that a large reduction in the worst intermodulation interference results. The system then inserts a channel in a new frequency location which produces a smaller worst intermodulation interference result. The process of deletion and insertion is continued until no reduction in the worst intermodulation interference results.

One effect of the Okinaka, et al. approach is the reduction of the intermodulation computation. However, this approach can only find a sub-optimal plan whose performance may be poor. For a satellite system when the number of channels per transponder is not large (for example, 10), it is possible to search more sub-optimal frequency plans and select a plan with the best performance.

The problems of determining an optimal carrier frequency plan is even more difficult when individual signals to be transmitted occupy different bandwidths. Furthermore, for systems where the channels occupy a significant portion of the transponder bandwidth the problem becomes even more acute.

Therefore, there is a need for an optimal carrier frequency planning system wherein carrier frequencies are derived and utilized to minimize intermodulation noise.

SUMMARY OF THE INVENTION

Accordingly, an object of the present invention is to derive a set of carrier frequencies for transmitting a plurality of signals over a given common communication bandwidth with a substantially low intermodulation interference.

Another object of the present invention is to provide a system which can provide such optimal frequency plan for a plurality of channels which occupy a significant portion of the common communication bandwidth.

A further object of the present invention is to provide such optimal frequency plan for a plurality of channels, wherein such signals are transmitted by QPSK modulation and Nyquist filtering.

A further object of the present invention is to provide such optimal frequency plan for a plurality of channels with different channel bandwidths.

In a preferred embodiment of the invention, the user can specify the number of channels and their respective bandwidths which may vary channel-to-channel. The user, has the option of defining which channels are at fixed locations and which parts of the common communications bandwidth constitute a dead band. Dead bands must be accounted for specifically in satellite communication systems, due to the potential for interference from cross-polarization, adjacent satellite and/or adjacent transponder satellite traffic.

The system first provides a plurality of random searches specified by the user. Within each random search, the channels are first placed in a random order within available transponder bandwidth from the lowest available frequency slot. This in turn provides a plurality of random sets of frequency plans. Each set of frequencies is evaluated by measuring third order intermodulation interference on each individual channel. The third order intermodulation interference on each individual channel is the sum of all the overlapping areas of third-order intermodulations and each individual channel.

Once the best set of channels and their corresponding carrier frequencies is determined using the single channel random searches, the system evaluates a dual channel search which completes the optimum frequency plan. Once the best frequencies are derived, the individual carrier frequencies may be tuned accordingly for a substantial reduction in intermodulation noise in the system.

DETAILED DESCRIPTION OF THE DRAWINGS

Figure 1:
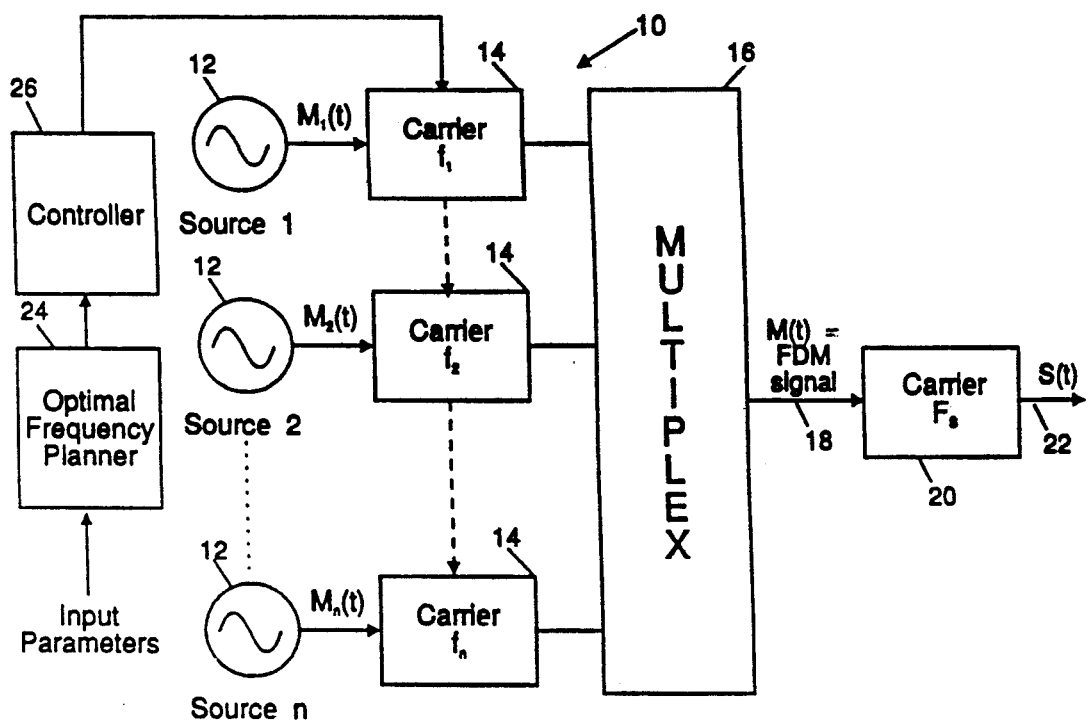
FIG. 1 illustrates a frequency division multiplexing (FDM) system with a frequency plan $f_1$ through $f_n$.

FIG. 1 illustrates a frequency division multiplexing (FDM) system 10. A plurality of signal sources 12 supply signals representing audio or video information that need to be transmitted. In one example of the present invention, the signal sources are modulated and transmitted over a satellite communication system.

Each of the signal sources are coupled to a modulator 14 having n carrier frequencies $f_1$ through $f_n$. A combiner 16 receives a plurality of individual signals upshifted by their carrier frequency. Combiner 16, combines the individual channels and provides a composite signal 18 m(t) with a bandwidth which is which is equal to the sum of bandwidths of individual signals. Signal 18, is then further modulated by a higher frequency modulator 20 to provide a signal 22 s(t) which has a bandwidth equal to or larger than the sum of individual bandwidths used in the system. An optimal frequency planner 24 receives the frequency parameters of the system. Typically such frequency parameters include the number of channels to be transmitted, their corresponding channel bandwidths, dead-bands and guard bands. The optimal frequency planner provides a set of carrier frequencies to a controller 26. The controller is coupled to individual modulators 14 and adjusts the earlier frequencies $f_1$ and $f_a$ according to the frequency plan for an optimal transmission.

Figure 2:
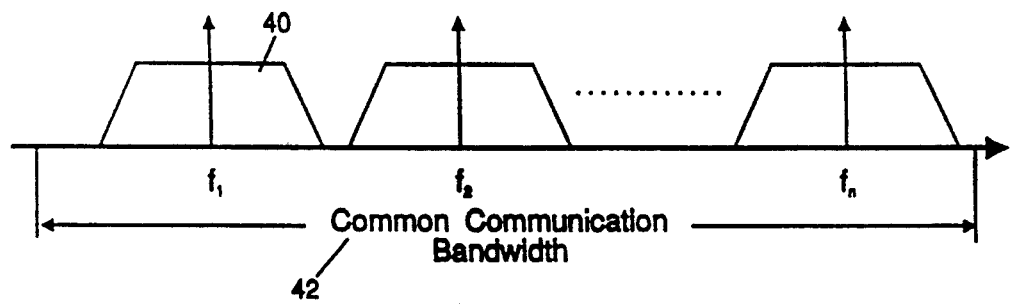
FIG. 2 illustrates the frequency spectrum of individual channels of FIG. 1 transmitted over a common communication bandwidth.

FIG. 2 illustrates the spectrum of individual channels 40 with carrier frequencies $f_1$ through $f_n$, which are transmitted over a common communication bandwidth 42. Depending on the frequencies chosen each channel 40 would experience a certain amount of intermodulation noise caused by the other frequencies.

To evaluate intermodulation interference (IM) in a satellite communication system, it is sufficient to take account of two types of third-order intermodulation interference (IM) products. The first type is $(f_i+f_{i+1}-f_{i+2})$ and the second type is $(2f_i-f_{i+1})$, where $f_{i+1}$ and $f_{i+2}$ are any one of the carrier frequencies $f_1$ through $f_n$ as illustrated in FIG. 2. The first type has 6dB greater power content than the second type. These two types of products have the dominant power among the interference modulation products. Fifth, seventh, and higher order intermodulation products have much lower power content compared to the third order intermodulation products and therefore, are not considered in this invention.

It can be assumed that each channel and the intermodulation interference, both have a uniform power spectrum inside of their bandwidths. This assumption is reasonable in view of the fact that in a preferred embodiment Nyquist channel shaping may b used for transmitting the signals. Also, the intermodulation is assumed to have a bandwidth equal to the largest bandwidth among the channels which are the cause of the intermodulation interference. The intensity of the intermodulation interference is proportional to the inverse of its bandwidth. Therefore, the total power of each intermodulation interference remains the same. The third order intermodulation interference on each individual channel 40 is the sum of all the overlapping areas of third-order intermodulations on each channel.

Figure 3:
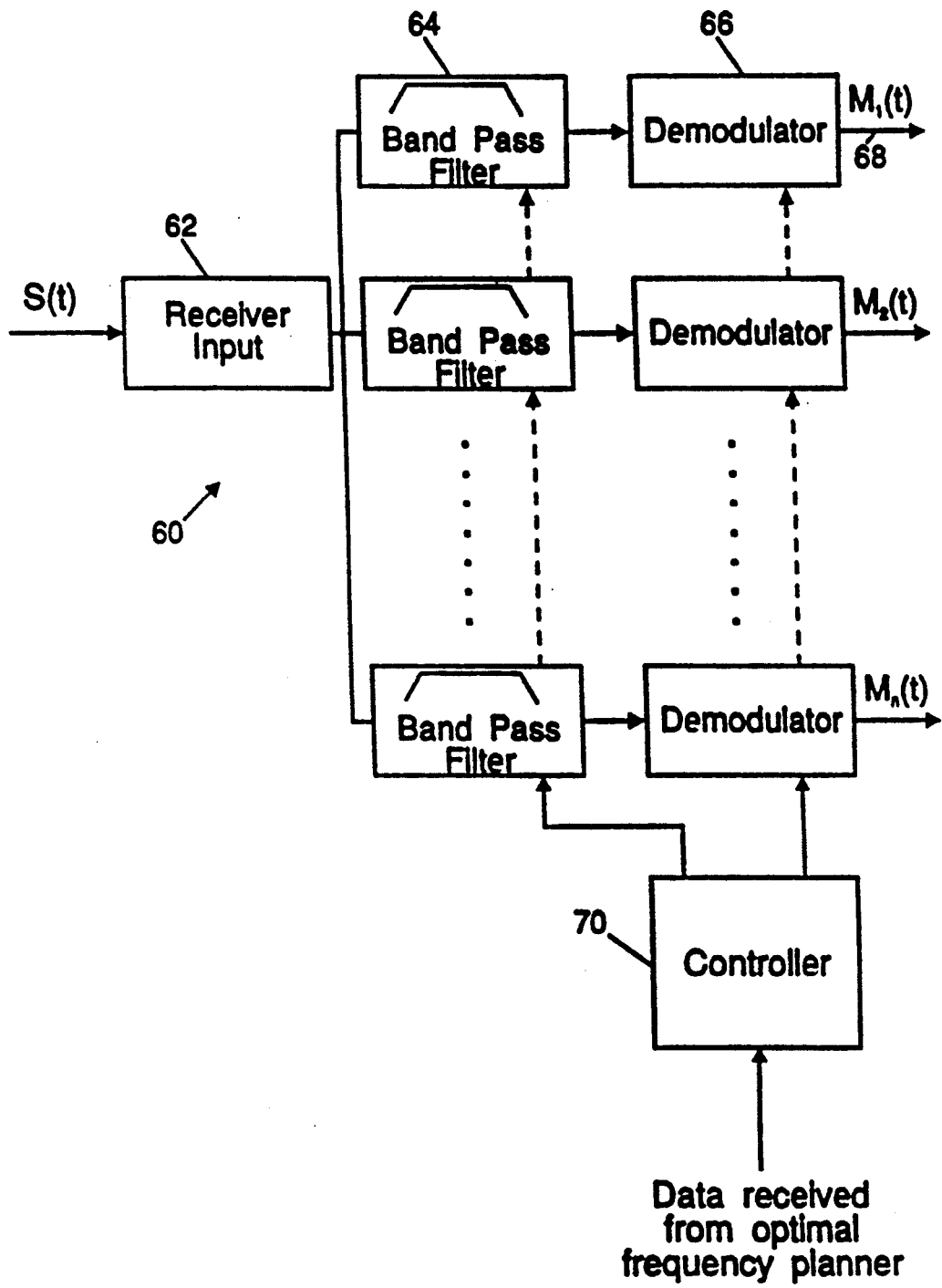
FIG. 3 illustrates a demodulator/receiver for receiving individual channels illustrated in FIG. 2.

FIG. 3 illustrates a receiver 60, adapted to receive signal 22 s(t), via receiver input 62. Each one of the band pass filters 64 receives a signal from receiver input 62. Each one of the band pass filters 64 is coupled to a controller 70. Controller 70 is provided with data generated from optimal frequency planner 24. The controller 70 arranges the bandwidth parameters of each filter 64 such that a channel 40 centered on a frequency $f_1$ through $f_n$ may be filtered out. In this way the signal 22 s(t) is again split into its component parts.

Each output of band pass filters 64 is coupled to a demodulator 66. Controller 70 is also coupled to each of the demodulators. Based on the frequency plan, controller 70 provides the appropriate demodulating frequency for the demodulations. In this way each component signal is demodulated to recover the original signals Mi(t).

Figure 4:
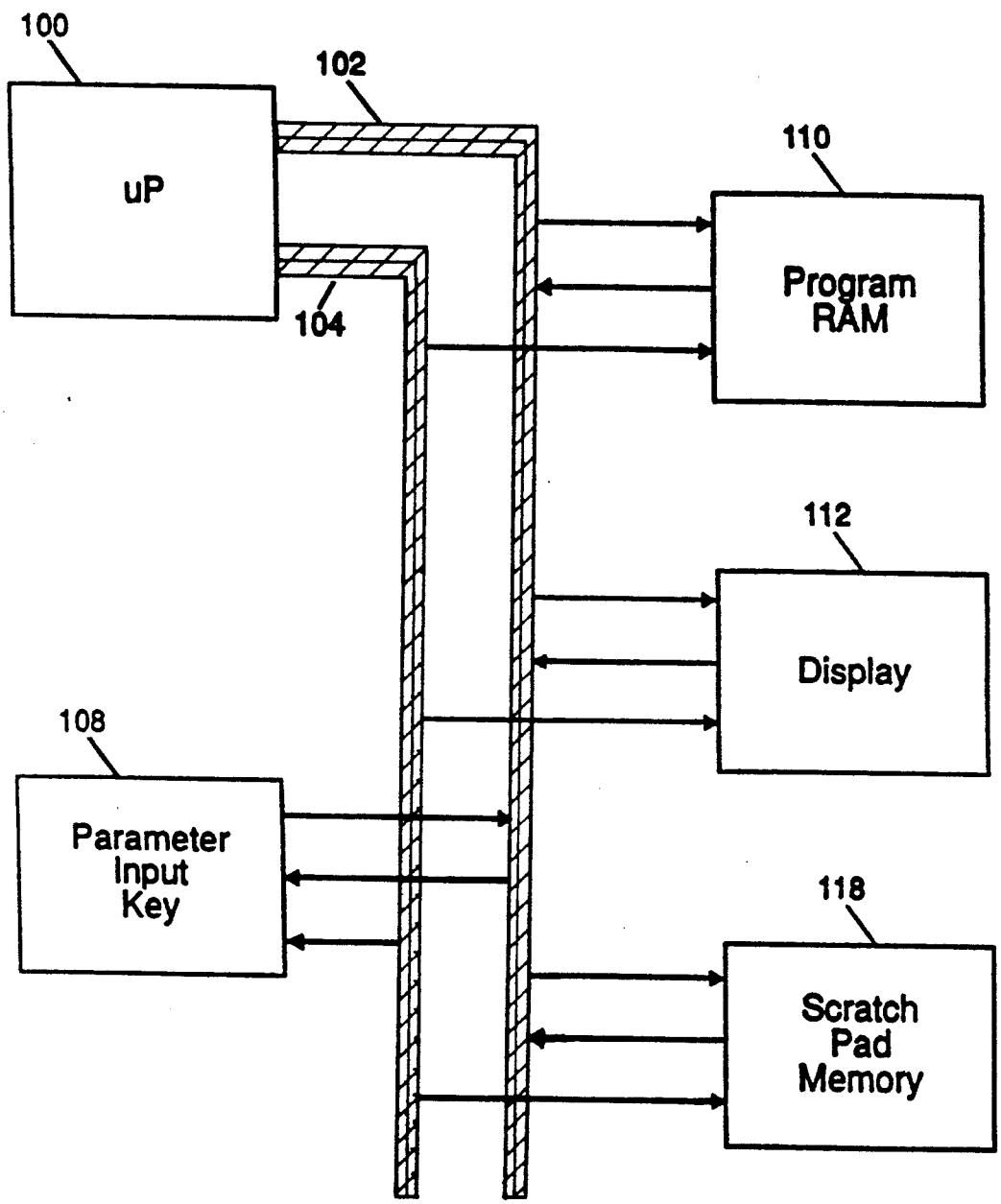
FIG. 4 illustrates one example of a preferred embodiment of the apparatus for determining an optimal frequency plan.

FIG. 4 illustrates an example of a preferred embodiment of frequency planner 24. The frequency planner contains a microprocessor 100 for monitoring and performing frequency calculations. Data bus 102 and control bus 104 are coupled to the microprocessor for transmitting control of data information to and from the microprocessor to various components of the frequency planner. Program RAM 110 contains the program for the microprocessor. Display 112 provides an alphanumeric display for interfacing the frequency planner with the system user. Input key 108 provides an input interface with the user. Scratch pad memory 118 is provided for the use of the microprocessor.

Figure 5:
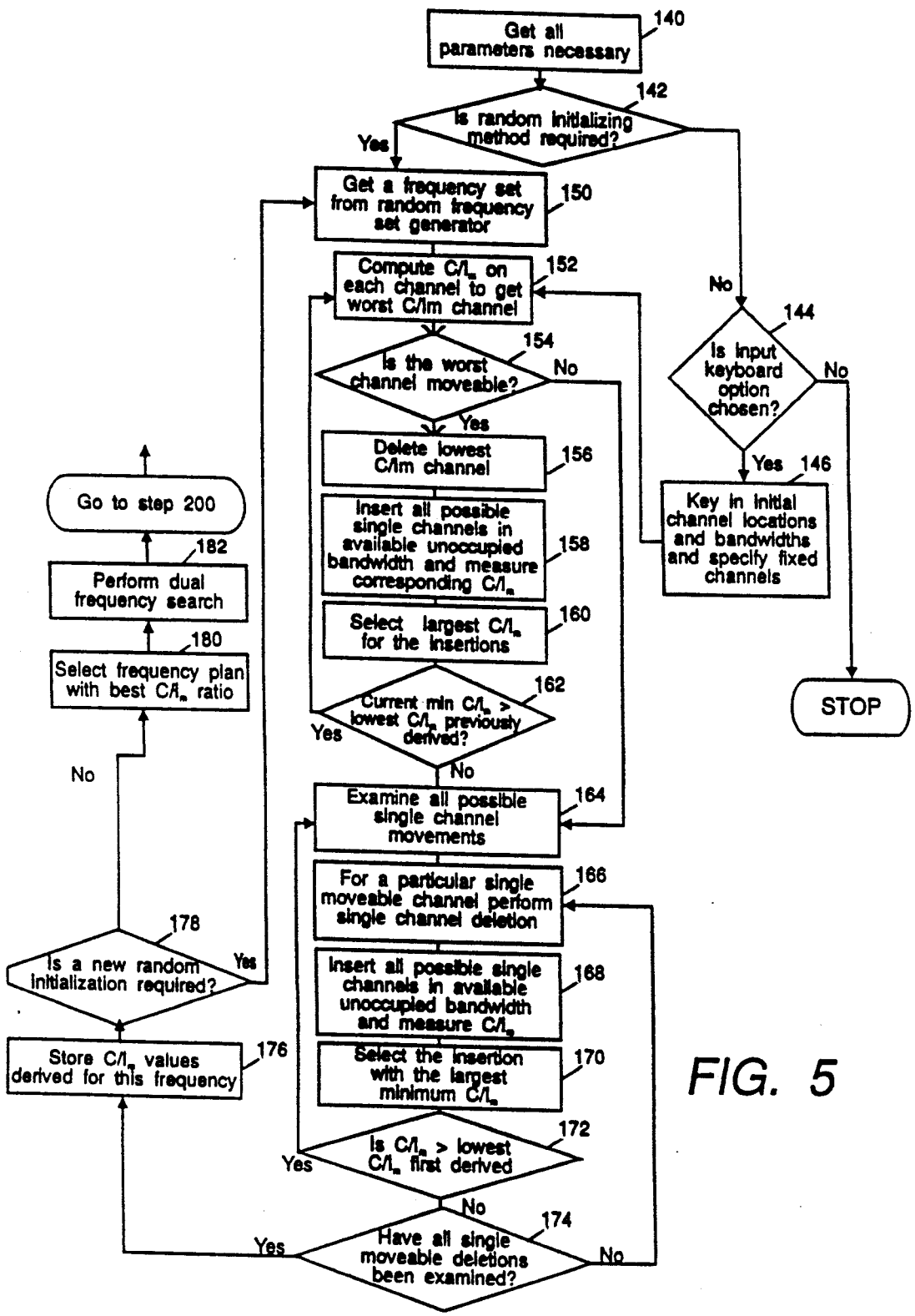
FIG. 5 is a flow chart of steps taken by the system to derive an initial set of frequencies with best results among various sets tested.
Figure 6:
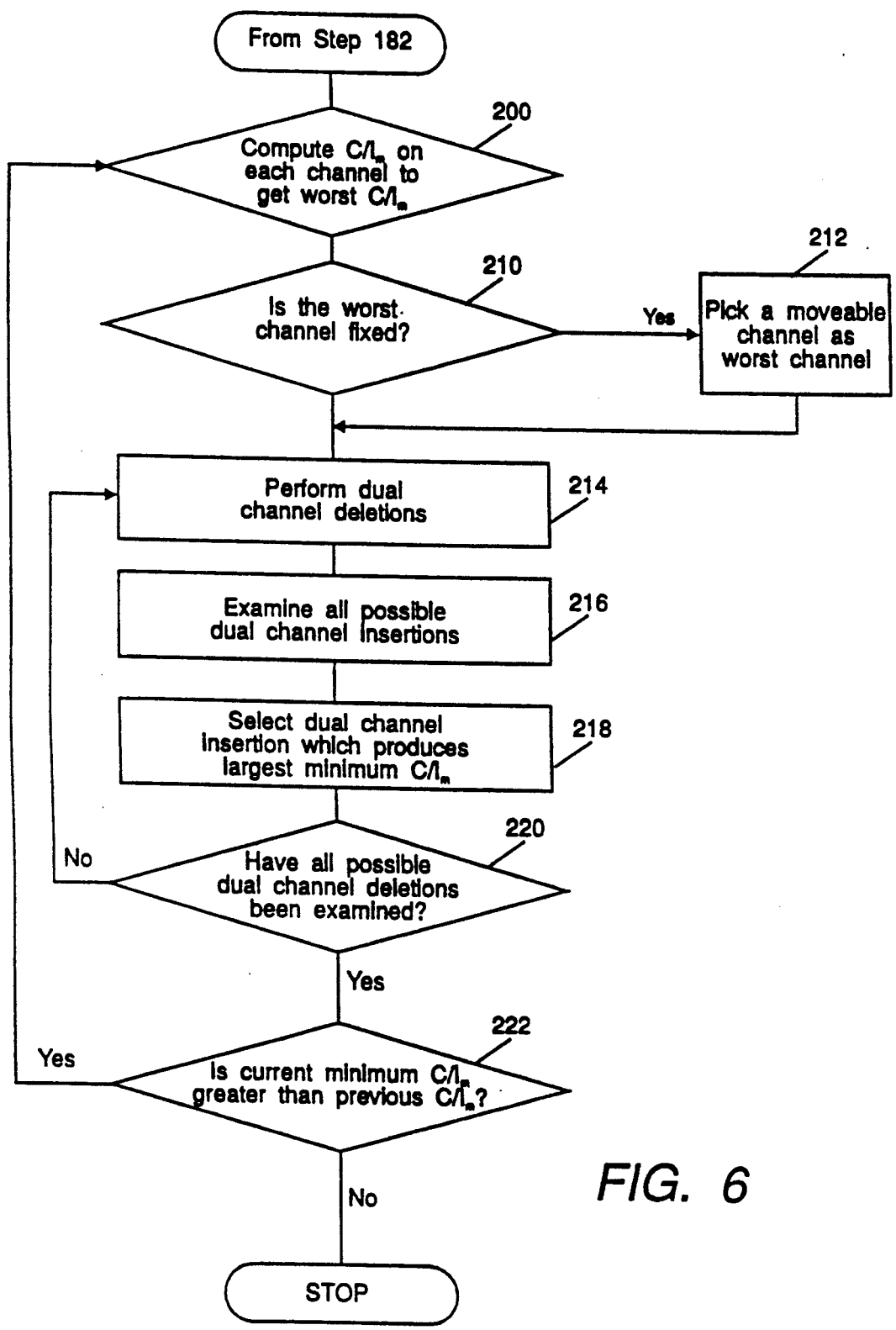
FIG. 6 is a flow chart of steps taken to provide a dual channel search for fine tuning the initial best result described as illustrated in FIG. 5.

FIG. 5 is a flow diagram of the steps taken by microprocessor 100 to derive an optimum frequency plan.

At step 140, the microprocessor retrieves pertinent information necessary for deriving the optimum frequency plan. For example, in a preferred invention, microprocessor 100 transmits prompting data to display 112 asking the user to input the required parameters via input key 108. The user can specify the frequency range of the common communication bandwidth. The user, in satellite transmission applications may specify the frequency range of the transponders' modulators, number of dead bands and their frequency ranges, number of fixed channels and their power bandwidths, number of channels to be allocated and their power bandwidths, and the minimum guard band, for each channel. It can be appreciated to those skilled in the art that allocation of dead-bands is necessary due to the potential for interference from cross-polarization, adjacent satellites, and/or adjacent satellite traffic.

The user can also choose the channel-location initialization method fixing some of the channel frequencies as required. The system includes an option for considering cross polarization frequency assignments.

At decision 142, the system determines whether a random initialization option is chosen. If random initialization is chosen as the channel-location initialization method, the user will be asked to key in the fixed-channel locations and bandwidths and input the number of kinds of movable-channel bandwidths, their bandwidth values, and the number of channels having the same bandwidth values. After that, the user will be asked to specify the consideration of the cross polarization interference and to input the number of random searches. The system then proceeds to step 150.

If random initialization was not chosen the system moves to decision 144 to determine whether input-from-keyboard option is chosen. If so, the user will be asked to key-in the initial channel locations and channel bandwidths and indicate which channels are fixed. After that, the system proceeds to step 152, for single channel and dual channel optimization searches.

The single-channel and dual-channel optimization searches to be described below only find local optimum frequency plans. Therefore, the random searching step 150 is used to increase the probability of locating a global optimum frequency plan.

At step 150, the channels are first placed in a random order within available bandwidth from the lowest available frequency slot. A minimum guard band is placed between the channels. Each channel is randomly selected and moved to a new random available location. This ensures a successful random channel allocation. Finally, the system at step 152, with this random initial condition begins a single-channel optimization search to find a local optimum frequency plan.

The process is repeated for a number of random initializations. The number of the random initialization may be defined by the user. Once all of the random searches are performed, the best of the local optimum frequency plans is taken as the initial global optimum frequency plan. The more times the random search is performed, the more likely the global optimum frequency plan will be found.

At step 152 the system measures intermodulation interference on each channel and finds the lowest carrier/intermodulation ratio (C/IM) level of all channels considered.

At decision 154, if the channel with the lowest carrier/intermodulation ratio (C/IM) is movable, then it will be deleted at step 156. Otherwise the system goes to step 164.

At step 158, the system examines all possible single-channel insertions in available unoccupied bandwidth by comparing their corresponding lowest carrier/intermodulation (C/IM) ratios.

At step 160, the system selects the single-channel insertion which produces the largest minimum carrier/intermodulation ratio (C/IM).

At decision 162, if value of the currently available minimum carrier/intermodulation (C/IM) ratio is greater than the one previously derived at step 152, the systems proceeds to step 152. If, on the other hand, the currently available value of the minimum carrier/intermodulation (C/IM) ratio is not greater than the one previously derived at step 152, the system proceeds to step 164.

At step 164, the system determines all possible channel movements which can be deleted and proceeds to step 166. At step 166, the system deletes a single-movable channel, and proceeds to step 168.

At step 168, all possible single-channel insertions in available unoccupied bandwidth are made, and the corresponding carrier/intermodulation ratio (C/IM) for each channel insertion is measured.

At step 170, the single-channel insertion which produces the largest minimum carrier/intermodulation (C/IM) ratio is selected The system then moves to decision 172.

At decision 172, if the (C/IM) ratio due to the currently selected single-channel insertion is greater than the (C/IM) ratio previously derived, the system proceeds to step 164 to start another loop of all possible single channel movements. Otherwise the system goes to decision 174.

At decision 174, the system determines if all possible single movable-channel deletions have been examined with no increase in the worst carrier/intermodulation (C/IM) ratio. If not so, the system goes to step 166 to perform another movable-channel deletion. However, if all single movable-channel deletions have been examined with no increase in (C/IM) ratio, the system moves to step 176, at which time the minimum (C/IM) ratio and the respective derived frequencies are stored.

The system then moves to decision 178 to determine whether a new random initialization is required. If not, at step 180, the system selects the stored frequency plan corresponding to the best (C/IM) ratios derived and goes to step 182 for a dual frequency search.

The dual-channel search is used to fine-tune the initial global optimization search. The search increases the carrier/intermodulation (C/IM) ratio, by adjusting the frequency plan using two channels concurrently in each optimization step.

Therefore, at step 200, the system computes intermodulation interference on each channel and finds the worst interference channel. The system then proceeds to decision 210 and determines whether the worst channel is fixed. If so, the system goes to step 212 and picks a movable Channel as the worst channel, before moving to step 214. At decision 210, if the worst channel is not fixed the system goes directly to step 214.

At step 214, the system starts to perform dual channel deletions, by deleting the worst channel and one of the other movable channels.

At step 216, for a particular dual-channel deletion performed at step 214, the system examines all possible dual channel insertions. Thereafter, at step 218, the dual-channel insertion which produces the largest worst C/IM is selected.

The system then goes to step 214, to examine the other dual-channel deletions until all possible dual channel deletions have been examined.

At decision 222, if the currently derived minimum carrier/intermodulation (C/IM) ratio is greater than the previous one at step 200, then the system goes to step 200 to start another loop of dual channel searching. The process is repeated until there is no further improvement in (C/IM) by dual channel searching.

As indicated above, in each random search, a random channel allocation followed by a single-channel optimized search is performed. During each search, the channel-location, the worst (C/IM) ratio and the distribution of C/IM will be graphically displayed on the display 112 of FIG. 4. Once all the random searches are done, the best of the sub-optimum frequency plans found is taken as the initial condition to perform a dual-channel optimized search. The process of dual-channel optimized search will also be graphically displayed on the display 112 of FIG. 4.

If the consideration of the cross polarization interference is requested, the local optimum frequency plan found by the single-channel optimized search during each random search is stored as a temporary horizontal frequency plan. The corresponding temporary vertical frequency plan is the best one among all allowable frequency plans resulting from offsetting each channels' center frequency of the temporary horizontal frequency plan by a certain frequency, for example +1 MHz or −1 MHz. After all the random searches are done, the output frequency plans are the best pair of horizontal and vertical plans with a maximum of the worst carrier-/intermodulation C/IM ratios, between horizontal and vertical frequency plans of any pair. The output frequency plans can be displayed respectively at display 112 of FIG. 4.

It can be appreciated to those skilled in the art that the method described according to one embodiment of the invention can also perform an analysis of (C/IM) ratios for a particular frequency plan.

Furthermore, the random searching process finds a reasonable appropriate frequency plan after a number of random searches, typically 25 searches.

It can be appreciated to those skilled in the art that the present invention and modifications thereof have potential applications in related areas. For example, the system may be used in generating self-orthogonal forward-error-correcting codes with properties applicable to certain circumstances.

Similarly, a phased array antenna having non-linear amplifiers in each radiating element and transmitting signals at different frequencies in different directions radiate intermodulation products in directions that are generally different from the main beam directions, thereby affecting protection from intermodulation interference. The relationship between the intermodulation beam directions and the main beam directions are essentially the same as those governing intermodulation locations in frequency domains. Hence, it is possible in multiple beam phased array systems to exploit different set sequences to suppress intermodulation interference in both the frequency and space domains.

I claim:

1. A method for operating a frequency division multiplexing (FDM) transmitter within a common communication channel, wherein a plurality of signals are transmitted through separate channels via a plurality of modulators having corresponding carrier frequencies, by adjusting each carrier frequency through the steps comprising:

(a) randomly allocating each separate channel within the available bandwidth to provide an initial set of separate channel allocation and corresponding carrier frequencies;
    (b) measuring carrier to intermodulation ratio(C/IM) on each channel;
    (c) removing the worst channel with the lowest carrier to intermodulation ratio (C/IM) when said worst channel can be moved or removing a movable channel previously nonremoved when said worst channel cannot be moved;
    (d) examining all possible single-channel insertions in available unoccupied bandwidth and selecting an insertion which produces the largest minimum carrier to intermodulation ratio (C/IM);
    (e) repeating steps (b) through (d) until no improvement in minimum carrier intermodulation ratio (C/IM) can be achieved for said random allocation of separate channels;
    (f) repeating steps (a)–(e) for plurality of initial random channel allocations, to achieve a set of separate channel allocations among said initial random channel allocations with largest minimum carrier to intermodulation ratio (C/IM); and
    (g) tuning the modulators corresponding to each carrier frequency in said frequency division multiplexing (FDM) transmitter according to said set of separate channel allocation.

2. The method according to claim 1 wherein said step (b) further comprises:

assigning first and second type interferences in said carrier to interference ratio (C/IM) wherein said first type interference is defined by $(f_i+f_{i+1}-f_{i+2})$ and the second type is $2f_i-f_{i+1}$, where $f_{i+1}$ and $f_{i+2}$ are any one of the separate carrier frequencies.

3. The method according to claim 2, further comprising the step of Nyquist shaping each separate signal to be transmitted by said frequency division multiplexing (FDM) transmitter.

4. The method according to claim 1, wherein said set of separate channel allocations is further fine-tuned before said step (g) of tuning carrier frequencies, said method comprising:

(h) deleting the worst channel with minimum carrier to intermodulation ratio (C/IM) if said worst channel can be removed or deleting a moveable channel instead of the worst channel if said worst channel cannot be removed;
    (i) deleting one other movable channel from separate channel allocations to provide a particular dual channel deletion;
    (j) inserting two channels in available unoccupied bandwidth which produces the largest minimum carrier to intermodulation ratio (C/IM); and
    (k) repeating steps (h) through (j) until no improvement in minimum carrier to intermodulation ratio (C/IM) can be achieved for said random allocation of separate channels.

5. A frequency planning system for adjusting carrier frequencies in a frequency division multiplexing (FDM) transmitter wherein a plurality of signals are transmitted through separate channels via a plurality of modulators having corresponding carrier frequencies comprising:

(a) a microprocessor for controlling the operation of said frequency planning system;
    (b) random channel allocating means randomly allocating each separate channel within the available transmission bandwidth to provide initial set of separate channel allocation and corresponding carrier frequencies;
    (c) a measuring means for determining carrier to intermodulation ratio(C/IM) on each channel so that the worst channel with the lowest carrier to intermodulation ratio (C/IM) is derived;
    (d) a channel removing means coupled to said measuring means for removing the worst channel with the lowest carrier to intermodulation ratio (C/IM) when said worst channel can be moved, said removing means, removing a movable channel previously not removed when said worst channel can not be removed;
    (e) a channel inserting means coupled to said channel removing means for repetitively inserting a channel allocation from available unoccupied bandwidth such that a channel allocation with the largest minimum carrier to intermodulation ratio (C/IM) is derived said removing means and said inserting means repetitively removing and inserting channel allocations until no improvement in minimum carrier intermodulation ratio (C/IM) can be achieved for said random allocation of separate channels;

(f) means for providing a plurality of said random channel allocation sets;

(g) means for deriving a best set of separate channel allocations among said initial random channel allocations with largest minimum carrier to intermodulation ratio (C/IM); and (h) a tuner means for tuning the modulators corresponding to each carrier frequency in said frequency division multiplexing (FDM) transmitter according to said set of separate channel allocation.

6. The system according to claim 5, wherein said measuring means derives said carrier to intermodulation (C/IM) ratio by computing first and second type interferences wherein said first type interference is defined by $(f_i + f_{i+1} - f_{i+2})$ and the second type is defined by $(2f_i - f_{i+1})$, where $f_i$, $f_{i+2}$ are any one of the separate carrier frequencies.

7. The system according to claim 6, further comprising a means for Nyquist shaping each separate signal to be transmitted by said frequency division multiplexing (FDM) transmitter.

8. The system according to claim 5 wherein said best set of separate channel allocations is further fine-tuned before said tuner means tunes carrier frequencies, wherein said channel removing means further removing the worst channel with minimum carrier to intermodulation ratio (C/IM) if said worst channel can be removed from said best set of separate channel allocations said channel removing means removing a moveable channel as the worst channel when said worst channel with minimum carrier to intermodulation ratio (C/IM) cannot be removed;

said channel removing means repetitively deleting one other moveable channel from set separate channel allocations to provide the particular dual channel deletion;

said channel inserting means further inserting two channels in available unoccupied bandwidth for each said channel deletion, until no improvement in minimum carrier to intermodulation ratio (C/IM) can be achieved for said best set of separate channel allocation.

* * * * *